United States Patent
Cao et al.

(10) Patent No.: US 9,667,152 B2
(45) Date of Patent: May 30, 2017

(54) POWER CONVERSION SYSTEM AND POWER CONVERSION METHOD

(71) Applicant: Murata Manufacturing Co., Ltd., Nagaokakyo-shi, Kyoto-fu (JP)

(72) Inventors: Yu Cao, Shanghai (CN); Kezhi Wang, Shanghai (CN)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/737,710

(22) Filed: Jun. 12, 2015

(65) Prior Publication Data

US 2015/0365002 A1    Dec. 17, 2015

(30) Foreign Application Priority Data

Jun. 13, 2014  (CN) .......................... 2014 1 0264522

(51) Int. Cl.
  *H02M 3/335* (2006.01)
  *H02M 3/28*  (2006.01)
  *H02J 1/10*  (2006.01)

(52) U.S. Cl.
  CPC ......... *H02M 3/33507* (2013.01); *H02J 1/102* (2013.01); *H02M 3/285* (2013.01)

(58) Field of Classification Search
  CPC ............................................ H02M 2001/0022
  See application file for complete search history.

(56) References Cited

U.S. PATENT DOCUMENTS

| | | | | |
|---|---|---|---|---|
| 4,114,048 A | * | 9/1978 | Hull | H02J 3/48 307/53 |
| 4,947,171 A | * | 8/1990 | Pfeifer | H03M 3/372 341/126 |
| 5,804,950 A | * | 9/1998 | Hwang | H02M 1/4225 323/222 |
| 5,903,138 A | * | 5/1999 | Hwang | H02M 1/4225 323/224 |
| 6,134,122 A | * | 10/2000 | Chen | 307/58 |
| 6,137,274 A | * | 10/2000 | Rajagopalan | H02J 1/102 323/272 |
| 6,534,960 B1 | * | 3/2003 | Wells | H02M 3/1584 323/222 |

(Continued)

FOREIGN PATENT DOCUMENTS

| | | |
|---|---|---|
| CN | 102340251 A | 2/2012 |
| TW | 200916997 A | 4/2009 |
| TW | 201025037 A1 | 7/2010 |

*Primary Examiner* — Fred E Finch, III
*Assistant Examiner* — Yusef Ahmed
(74) *Attorney, Agent, or Firm* — Keating & Bennett, LLP

(57) ABSTRACT

A power conversion system includes at least two power converters and a current sharing bus, each power converter including a switching circuit, a power conversion circuit configured to receive an input voltage via the switching circuit and to provide a local output current, an output sense circuit configured to detect the local output current and to generate a local output current sense signal, a current sharing terminal coupled to the local output current sense signal via a resistor and coupled to the current sharing bus; and a PWM controller configured to adjust a duty cycle of the switching circuit based at least in part on the local output current sense signal provided by the output sense circuit and an average current signal on the current sharing bus.

22 Claims, 7 Drawing Sheets

(56) References Cited

U.S. PATENT DOCUMENTS

| | | | | |
|---|---|---|---|---|
| 7,301,314 B2* | 11/2007 | Schuellein | H02M 3/1584 | 323/225 |
| 7,613,017 B1* | 11/2009 | Diana | H02M 3/33507 | 363/20 |
| 7,633,782 B1* | 12/2009 | Herbert | G05F 1/70 | 323/207 |
| 2003/0048648 A1* | 3/2003 | Lin | H02M 3/1584 | 363/65 |
| 2003/0090237 A1* | 5/2003 | Shenai | H02J 7/0052 | 320/139 |
| 2004/0046535 A1* | 3/2004 | Duffy | H02M 3/1584 | 323/283 |
| 2004/0075600 A1* | 4/2004 | Vera | H02J 1/102 | 341/166 |
| 2004/0150378 A1* | 8/2004 | Gattavari | H02M 3/156 | 323/282 |
| 2004/0169499 A1* | 9/2004 | Huang | H02M 3/1584 | 323/272 |
| 2004/0217741 A1* | 11/2004 | Muratov | H02M 3/1584 | 323/219 |
| 2005/0010825 A1* | 1/2005 | Pullen | H02M 3/1584 | 713/300 |
| 2005/0010826 A1* | 1/2005 | Pullen | H02M 3/156 | 713/300 |
| 2005/0046404 A1* | 3/2005 | Uusitalo | H02M 3/33569 | 323/285 |
| 2007/0176584 A1* | 8/2007 | Chen | H02M 3/33507 | 323/282 |
| 2008/0197823 A1* | 8/2008 | Crowther | H02M 3/1584 | 323/271 |
| 2009/0009148 A1 | 1/2009 | Philbrick | | |
| 2009/0039704 A1* | 2/2009 | Chen | H02J 1/102 | 307/52 |
| 2009/0066305 A1* | 3/2009 | Noda | H02M 3/1588 | 323/282 |
| 2009/0128116 A1* | 5/2009 | Noda | H02M 3/1588 | 323/290 |
| 2009/0278520 A1* | 11/2009 | Perreault | H02M 3/07 | 323/282 |
| 2010/0026208 A1* | 2/2010 | Shteynberg | H05B 33/0815 | 315/297 |
| 2010/0052627 A1* | 3/2010 | Otsuka | H02M 3/156 | 323/225 |
| 2010/0127682 A1 | 5/2010 | Kenly et al. | | |
| 2010/0195355 A1* | 8/2010 | Zheng | H02M 3/33507 | 363/21.12 |
| 2010/0208502 A1* | 8/2010 | Horii | H02M 3/33507 | 363/131 |
| 2010/0225293 A1* | 9/2010 | Wang | H02M 3/33507 | 323/290 |
| 2010/0238060 A1* | 9/2010 | Nien | H02M 3/1584 | 341/155 |
| 2010/0277140 A1* | 11/2010 | Liu | H02J 1/10 | 323/234 |
| 2010/0315043 A1* | 12/2010 | Chau | B60L 3/0046 | 320/134 |
| 2010/0321958 A1* | 12/2010 | Brinlee | H02M 3/28 | 363/21.1 |
| 2011/0011842 A1* | 1/2011 | Thomas | B23K 9/1043 | 219/130.21 |
| 2011/0080115 A1* | 4/2011 | Ge | H05B 33/0812 | 315/294 |
| 2011/0121870 A1* | 5/2011 | Morino | H03K 17/22 | 327/143 |
| 2011/0160928 A1* | 6/2011 | Chen | H01M 8/04589 | 700/295 |
| 2012/0014152 A1* | 1/2012 | Nakamura | H02M 1/4258 | 363/126 |
| 2012/0020119 A1 | 1/2012 | Tang et al. | | |
| 2012/0306466 A1* | 12/2012 | Tabuchi | H02M 3/156 | 323/282 |
| 2013/0021009 A1* | 1/2013 | Waltman | H02M 3/156 | 323/271 |
| 2013/0021702 A1* | 1/2013 | Waltman | H02H 3/24 | 361/91.1 |
| 2013/0082611 A1* | 4/2013 | Cohen | H05B 33/0815 | 315/185 R |
| 2013/0250627 A1* | 9/2013 | Herfurth | H02M 3/3376 | 363/21.15 |
| 2014/0103861 A1* | 4/2014 | Carletti | H02M 1/4225 | 320/107 |
| 2014/0240051 A1* | 8/2014 | Buono | H03F 3/183 | 330/297 |
| 2014/0300274 A1* | 10/2014 | Acatrinei | H05B 33/0815 | 315/85 |
| 2014/0312857 A1* | 10/2014 | Zheng | H02M 1/32 | 323/234 |
| 2015/0076910 A1* | 3/2015 | Wang | H02J 1/04 | 307/52 |
| 2015/0280612 A1* | 10/2015 | Ide | H02M 7/53871 | 363/98 |

* cited by examiner

POWER CONVERSION SYSTEM AND POWER CONVERSION METHOD

CROSS REFERENCE TO RELATED APPLICATION

This application claims priority from Chinese Patent Application No. 201410264522.2 filed on Jun. 13, 2014, the entire disclosure of which is hereby incorporated herein by reference.

BACKGROUND OF THE INVENTION

1. Field of the Invention

The present invention relates generally to a power conversion system and power conversion method, and more particularly, to a system and method for controlling a duty cycle of a switching power supply.

2. Description of the Related Art

Due to the different power requirements of various applications, power converters, such as switching power supplies, are widely employed in the electrical technical field to supply desired voltages/currents. The switching power supply maintains a stable voltage or current output at an output side of a power conversion circuit by controlling the on/off (and thus a duty cycle) of a switching circuit at an input side of the power conversion circuit. Such a power conversion circuit may be implemented, for example, with a transformer, which converts an input voltage received at a primary side into an output voltage and current at a secondary side.

In one aspect, it is desirable to improve the efficiency of such a power converter, e.g., a ratio of the output power to the input power. In another aspect, it is desirable for such a power converter to have a high power density, e.g., the ratio of the output power to the volume of the power converter. In yet another aspect, it is desirable for a power converter to have good Line Regulation and/or Load Regulation. Line Regulation, also known as Input Voltage Regulation, refers to the percentage of the output voltage deviating from the nominal output voltage when the input voltage varies in a full input range. Load Regulation refers to the variation of the output voltage when the load increases from zero to a nominal value under a fixed input voltage.

In the prior art, some power converters have fixed output voltages, and thus may have relatively good Line Regulation and Load Regulation. However, since the duty cycle of the switching circuit may have to be adjusted within a wide range depending on the variation of the input voltage in order to maintain the fixed output voltages, the circuit design is complicated and thus may be unable to satisfy the requirements of high efficiency and high power density. Yet some power converters use a fixed duty cycle for the switching circuit, e.g., a duty cycle of approximately 50%. Such a switching power supply may use a self-driven synchronization rectifier on the secondary side, and thus the output inductance may be designed to be very small, thereby achieving a relatively high efficiency and high power density. However, with a fixed duty cycle, the output voltage changes along with the input voltage, likely resulting in poor Line Regulation and/or Load Regulation.

Moreover, since a single power converter may have limited power, it may be necessary to provide power to the load with multiple power converters in parallel, in order to meet the power or current requirements of the load. In this situation, it is desirable to consider the current equalization of the multiple power converters.

SUMMARY OF THE INVENTION

Preferred embodiments of the present invention provide a power conversion system that includes a plurality of power converters to provide power to the load in parallel. Preferred embodiments of the present invention advantageously equalize the output currents of the plurality of parallel power converters. Each power converter may adjust a duty cycle within a relatively narrow variation range, so as to provide good load regulation, high efficiency, and/or high power density.

According to a preferred embodiment of the present invention, a power conversion system includes at least two power converters and a current sharing bus, each of the at least two power converters including a switching circuit; a power conversion circuit configured to receive an input voltage via the switching circuit and to provide a local output current; an output sense circuit configured to detect the local output current and to generate a local output current sense signal; a current sharing terminal coupled to the local output current sense signal via a resistor and coupled to the current sharing bus; and a PWM controller configured to adjust a duty cycle of the switching circuit based at least in part on the local output current sense signal provided by the output sense circuit and an average current signal on the current sharing bus.

In a preferred embodiment of the present invention, each power converter further includes an error amplifier configured to receive the local output current sense signal and the average current signal to generate a current sharing error signal, wherein the PWM controller is configured to adjust the duty cycle of the switching circuit according to the current sharing error signal.

In a preferred embodiment of the present invention, each power converter is configured such that, if the local output current sense signal is higher than the average current signal, the duty cycle of the switching circuit is decreased; or if the local output current sense signal is lower than the average current signal, the duty cycle of the switching circuit is increased.

In a preferred embodiment of the present invention, the output sense circuit is configured to further detect a local output voltage of the power conversion circuit and generate a local output voltage sense signal, wherein the PWM controller adjusts the duty cycle of the switching circuit further based on the local output voltage sense signal.

In a preferred embodiment of the present invention, each power converter further includes an input voltage sense circuit configured to detect the input voltage and generate an input voltage sense signal, wherein the PWM controller is configured to adjust the duty cycle of the switching circuit further based on the input voltage sense signal provided by the input voltage sense circuit.

In a preferred embodiment of the present invention, if the input voltage sense signal indicates a change in the input voltage, the PWM controller is configured to adjust the duty cycle of the switching circuit within a preset range such that a change rate of the output voltage is lower than a change rate of the input voltage.

In a preferred embodiment of the present invention, each power converter further includes a reference voltage module configured to generate a reference voltage based on the input voltage sense signal provided by the input voltage sense circuit such that the reference voltage is proportional to the input voltage; and a first operational amplifier configured to generate a first comparison signal based on a difference between a local output voltage sense signal and the reference voltage, the local output voltage sense signal being generated by the output sense circuit detecting a local output voltage of the power conversion circuit, the first comparison signal being provided to the PWM controller as a feedback signal, wherein the PWM controller is configured to adjust the duty cycle of the switching circuit within a preset range according to the feedback signal such that the output voltage is maintained at a level proportional to the reference voltage.

In a preferred embodiment of the present invention, each power converter further includes a second operational amplifier configured to generate a second comparison signal based on a difference between the local output current sense signal and the first comparison signal, the second comparison signal being provided to the PWM controller as the feedback signal.

In a preferred embodiment of the present invention, if the input voltage changes, the output voltage varies along with the input voltage; and if the input voltage does not change, the PWM controller adjusts the duty cycle of the switching circuit within a preset range such that the output voltage remains unchanged.

In a preferred embodiment of the present invention, the power converter is an isolated power converter, and includes an isolator to transfer signals in an isolated manner between a primary side and a secondary side of the power converter.

According to a preferred embodiment of the present invention, a method for controlling a power conversion system including at least two power converters and a current sharing bus, includes the steps of, in each power converter, receiving an input voltage via a switching circuit and providing a local output current; detecting the local output current and generating a local output current sense signal; coupling the local output current sense signal to the current sharing bus via a resistor; and adjusting a duty cycle of the switching circuit based at least in part on the local output current sense signal and an average current signal on the current sharing bus.

In a preferred embodiment of the present invention, the method also includes the steps of, in each power converter, generating a current sharing error signal according to a difference between the local output current sense signal and the average current signal, and adjusting the duty cycle of the switching circuit according to the current sharing error signal.

In a preferred embodiment of the present invention, the method also includes the steps of, in each power converter, decreasing the duty cycle of the switching circuit if the local output current sense signal is higher than the average current signal; or increasing the duty cycle of the switching circuit if the local output current sense signal is lower than the average current signal.

In a preferred embodiment of the present invention, the method also includes the steps of, in each power converter, detecting a local output voltage and generating a local output voltage sense signal; and adjusting the duty cycle of the switching circuit further based on the local output voltage sense signal.

In a preferred embodiment of the present invention, the method also includes the steps of, in each power converter, detecting an input voltage and generating an input voltage sense signal, and adjusting the duty cycle of the switching circuit further based on the input voltage sense signal.

In a preferred embodiment of the present invention, the method also includes the steps of, if the input voltage sense signal indicates a change in the input voltage, adjusting the duty cycle of the switching circuit within a preset range such that a change rate of the output voltage is lower than a change rate of the input voltage.

In a preferred embodiment of the present invention, the method also includes the steps of, in each power converter, generating a reference voltage based on the input voltage sense signal such that the reference voltage is proportional to the input voltage; generating a first comparison signal as a feedback signal based on a difference between a local output voltage sense signal and the reference voltage, the local output voltage sense signal being generated by detecting a local output voltage; and adjusting the duty cycle of the switching circuit within a preset range according to the feedback signal such that the output voltage is maintained at a level proportional to the reference voltage.

In a preferred embodiment of the present invention, the method also includes the step of, in each power converter, generating a second comparison signal as the feedback signal based on a difference between the local output current sense signal and the first comparison signal.

In a preferred embodiment of the present invention, if the input voltage changes, the output voltage varies along with the input voltage; and if the input voltage does not change, the duty cycle of the switching circuit is adjusted within a preset range such that the output voltage remains unchanged.

In a preferred embodiment of the present invention, the power converter is an isolated power converter, and includes an isolator to transfer signals in an isolated manner between a primary side and a secondary side of the power converter.

According to another preferred embodiment of the present invention, a power conversion system includes at least two power converters and a current sharing bus, each power converter including means for receiving an input voltage via a switching circuit and providing a local output current; means for detecting the local output current and generating a local output current sense signal; means for coupling the local output current sense signal to the current sharing bus via a resistor; and means for adjusting a duty cycle of the switching circuit based at least in part on the local output current sense signal and an average current signal on the current sharing bus.

In a preferred embodiment of the present invention, each power converter also includes means for generating a current sharing error signal according to a difference between the local output current sense signal and the average current signal; and means for adjusting the duty cycle of the switching circuit according to the current sharing error signal.

In a preferred embodiment of the present invention, each power converter also includes means for decreasing the duty cycle of the switching circuit if the local output current sense signal is higher than the average current signal; and means for increasing the duty cycle of the switching circuit if the local output current sense signal is lower than the average current signal.

In a preferred embodiment of the present invention, each power converter also includes means for detecting a local output voltage and generating a local output voltage sense signal; and means for adjusting the duty cycle of the switching circuit further based on the local output voltage sense signal.

In a preferred embodiment of the present invention, each power converter also includes means for detecting an input voltage and generating an input voltage sense signal; and means for adjusting the duty cycle of the switching circuit further based on the input voltage sense signal.

In a preferred embodiment of the present invention, each power converter also includes means for adjusting the duty cycle of the switching circuit within a preset range if the input voltage sense signal indicates a change in the input voltage such that a change rate of the output voltage is lower than a change rate of the input voltage.

In a preferred embodiment of the present invention, each power converter also includes means for generating a reference voltage based on the input voltage sense signal such that the reference voltage is proportional to the input voltage; means for generating a first comparison signal as a feedback signal based on a difference between a local output voltage sense signal and the reference voltage, the local output voltage sense signal being generated by detecting a local output voltage; and means for adjusting the duty cycle of the switching circuit within a preset range according to the feedback signal such that the output voltage is maintained at a level proportional to the reference voltage.

In a preferred embodiment of the present invention, each power converter also includes means for generating a second comparison signal as the feedback signal based on a difference between the local output current sense signal and the first comparison signal.

In a preferred embodiment of the present invention, if the input voltage changes, the output voltage varies along with the input voltage, and wherein each power converter also includes means for adjusting the duty cycle of the switching circuit within a preset range if the input voltage does not change, such that the output voltage remains unchanged.

In a preferred embodiment of the present invention, the power converter is an isolated power converter, and includes an isolator to transfer signals in an isolated manner between a primary side and a secondary side of the power converter.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
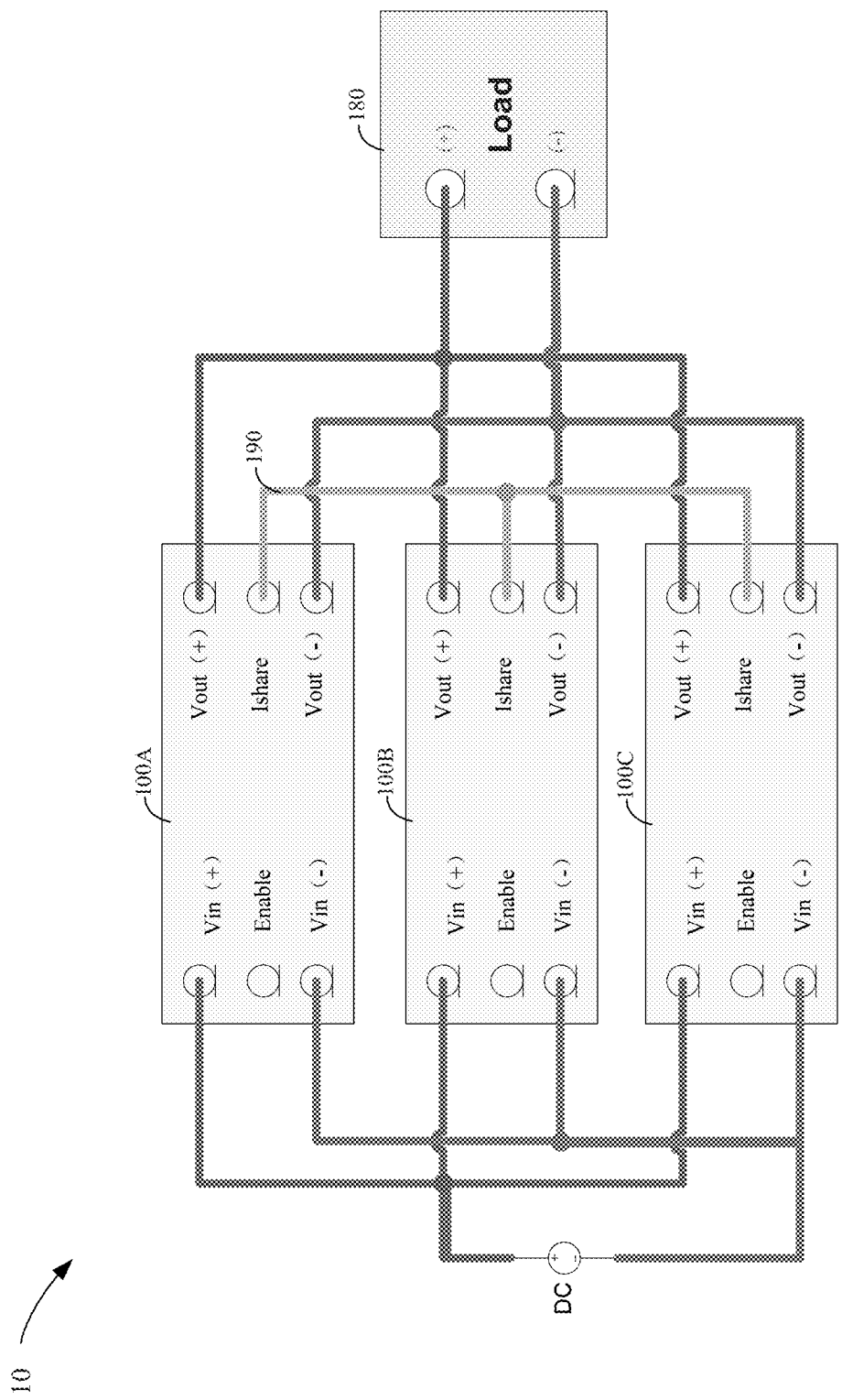
FIG. 1 illustrates a simplified block diagram of a power conversion system according to a preferred embodiment of the present invention.

The present invention is described in further detail below in conjunction with specific preferred embodiments and drawings. The following description and accompanying drawings are exemplary, without limiting the scope of the present invention. Elements with the same or like numerals in the drawings may operate similarly. The particular structures shown in the drawings are merely possible examples, and can be modified within the scope of the present invention as desired, without departing from the spirit and scope of the present invention.

FIG. 1 illustrates a simplified block diagram of a power conversion system 10 according to a preferred embodiment of the present invention. The power conversion system 10 may include at least two power converters 100. By way of example but not limitation, FIG. 1 shows three power converters 100A, 100B and 100C. More power converters 100 may be coupled in parallel by those skilled in the art, depending on the implementations. These power converters 100 may have a similar or identical topology, and provide power to a load 180 in parallel. In particular, each power converter 100 may include a positive input voltage terminal Vin(+), a negative input voltage terminal Vin(−), an enable terminal Enable, a positive output voltage terminal Vout(+), a negative output voltage terminal Vout(−), and a current sharing terminal Ishare. As shown in FIG. 1, each power converter 100 has its positive input voltage terminal Vin(+) and negative input voltage terminal Vin(−) to be coupled respectively to a positive and negative terminal of an input voltage (DC), wherein the power converter 100 is enabled to operate when the enable terminal Enable receives an enable signal. Each power converter 100 converts the received input voltage to a local output voltage and/or local output current on the positive output voltage terminal Vout(+) and negative output voltage terminal Vout(−). The various power converters 100 have their positive output voltage terminals Vout(+) coupled together to a positive terminal of the load 180, and the various power converters 100 have their negative output voltage terminals Vout(−) coupled together to a negative terminal of the load 180. Accordingly, the plurality of power converters 100 provide power to the load 180 in parallel. In an exemplary preferred embodiment, the negative input voltage terminal Vin(−) and/or the negative output voltage terminals Vout(−) may be coupled to ground.

In addition, the power conversion system 10 may further include a current sharing bus 190, wherein each power converter 100 has its current sharing terminal Ishare being coupled to the current sharing bus 190, thus generating an average current signal on the current sharing bus 190. As described below in further detail, each power converter 100 may adjust its local output current according to the average current signal on the current sharing bus 190, thus equalizing the output currents of the various power converters 100. That is, when two or more power converters 100 are expected to operate in parallel, a current sharing terminal Ishare is added into each power converter 100, such that the various power converters 100 may have equalized output currents.

Figure 2:
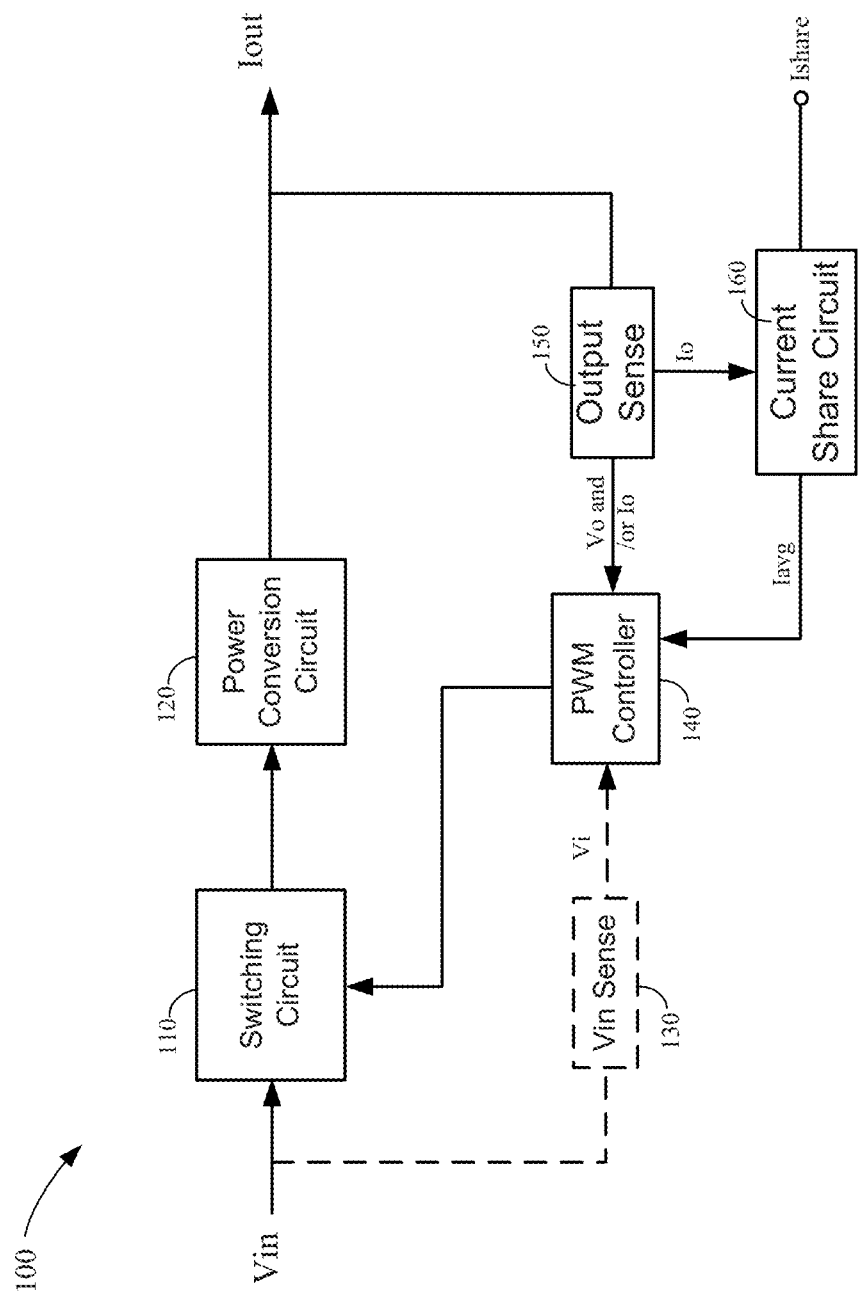
FIG. 2 illustrates a simplified block diagram of a power converter according to a preferred embodiment of the present invention.

FIG. 2 illustrates a simplified block diagram of a power converter 100 according to a preferred embodiment of the present invention. The power converter 100 may correspond to any one of the power converters 100A, 100B and 100C as shown in FIG. 1. The power converter 100 may be, for example, a DC/DC converter. The power converter 100 may include a switching circuit 110, a power conversion circuit 120, an optional Vin (input voltage) sense circuit 130, a PWM (Pulse Width Modulation) controller 140, an output sense circuit 150, and a current sharing circuit 160. The power conversion circuit 120 receives the input voltage Vin via the switching circuit 110 and converts it into a desired output voltage Vout (and/or output current Iout), wherein the PWM controller 140 generates a PWM signal to control the on/off of the switching circuit 110. The on time ratio (i.e., the duty cycle) of the switching circuit 110 will affect the value of the output voltage Vout (and/or the output current Iout).

Each power converter 100 includes an output sense circuit 150 configured to detect the output voltage Vout (and/or the output current Iout) of the power converter 100 and to generate an (local) output voltage sense signal Vo (and/or output current sense signal Io). For example, the output voltage sense signal Vo may be a divided signal of the output voltage Vout or may otherwise provide information about the output voltage Vout. The output current sense signal Io may be equal to the output current Iout or may otherwise provide information about the output current Iout (e.g., a corresponding voltage signal). Moreover, the optional Vin sense circuit 130 detects the input voltage Vin and generates an input voltage sense signal Vi. For example, the input voltage sense signal Vi may be a divided signal of the input voltage Vin or may otherwise provide information about the input voltage Vin.

The current sharing circuit 160 couples the local output current sense signal Io provided by the output sense circuit 150 to the current sharing bus 190 (see FIG. 1) via the terminal Ishare. When a plurality of power converters 100 generate respective local output current sense signals Io that are coupled to the current sharing bus 190, an average current signal Iavg is generated on the current sharing bus 190 (Iavg may be represented by a corresponding voltage signal). The current sharing circuit 160 further passes the average current signal Iavg on the current sharing bus 190 to the PWM controller 140, which may adjust the duty cycle of the switching circuit 110 based on both the average current signal Iavg and the local output current sense signal Io. For example, the PWM controller 140 may adjust the duty cycle of the switching circuit 110, such that the local output current sense signal Io of the power converter 100 is equal or approximately equal to the average current signal Iavg or is within a certain tolerance of the average current signal Iavg, thus equalizing the output currents of the plurality of parallel power converters 100. Although FIG. 2 illustrates the current sharing circuit 160 as a separate circuit module, in other implementations, the current sharing circuit 160 may be integrated into the PWM controller 140.

Moreover, the PWM controller 140 may further control the duty cycle of the switching circuit 110 based at least in part on the input voltage sense signal Vi provided by the Vin sense circuit 130, and/or on the output voltage sense signal Vo (and/or the output current sense signal Io) provided by the output sense circuit 150. In the power converter 100 as shown in FIG. 2, the output sense circuit 150 provides closed loop feedback control, such that the PWM controller 140 may adaptively adjust the duty cycle of the switching circuit 110 based at least in part on the input voltage Vin and the output voltage Vout (and/or the output current Iout).

More particularly, the PWM controller 140 may adjust the duty cycle of the switching circuit 110 based on a difference between the local output voltage sense signal Vo (or the local output current sense signal Io) provided by the output sense circuit 150 and a reference signal, thus generating a desired output voltage Vout and/or output current Iout. In addition, the PWM controller 140 may adjust the duty cycle of the switching circuit 110 within a preset range based at least in part on the input voltage sense signal Vi provided by the Vin sense circuit 130, so as to mitigate the instability of the output voltage Vout caused by the variation of the input voltage Vin. For example, if the Vin sense circuit 130 detects an increase in the input voltage Vin, the PWM controller 140 may reduce the duty cycle of the switching circuit 110 such that the output voltage Vout increases slowly as the input voltage Vin increases. Similarly, if the Vin sense circuit 130 detects a decease in the input voltage Vin, the PWM controller 140 may increase the duty cycle of the switching circuit 110 such that the output voltage Vout may decrease slowly as the input voltage Vin decreases. By adjusting the duty cycle in a preset range such that the change rate of the output voltage Vout is lower than the change rate of the input voltage Vin, the stability of the output voltage Vout is improved.

As above, the PWM controller 140 may combine (e.g., accumulate, weight and combine, etc.) the feedback information indicating an increase/decrease in the duty cycle, such as being provided by the input voltage sense signal Vi, the output voltage sense signal Vo, the output current sense signal Io, the average current signal Iavg, etc., so as to adjust the duty cycle of the switching circuit 110 in a collaborative manner, thus equalizing the output currents of the plurality of parallel power converters 100, and improving the Line Regulation as well as power conversion efficiency of the power converter 100.

Figure 3:
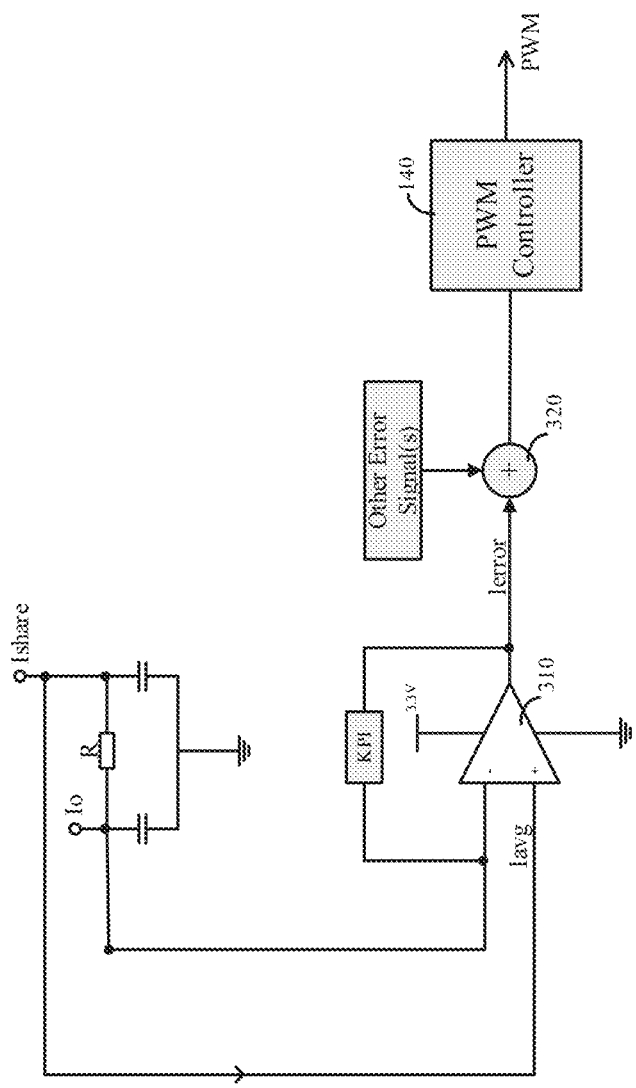
FIG. 3 illustrates a schematic diagram of a current sharing circuit of a power converter according to a preferred embodiment of the present invention.

FIG. 3 illustrates a schematic diagram of a current sharing circuit 160 in a power converter 100 according to a preferred embodiment of the present invention. The current sharing circuit 160 may include a resistor R and optional capacitors. Also refer to FIG. 1 and FIG. 2, each power converter 100 includes a current sharing terminal Ishare, which is coupled via the resistor R to the local output current sense signal Io of the power converter 100 as being provided by the output sense circuit 150. Moreover, as shown in FIG. 1, a plurality of power converters 100 has their current sharing terminals Ishare coupled to the current sharing bus 190, thus generating an average current signal Iavg on the current sharing bus 190 (Iavg may be represented by a corresponding voltage signal). That is, the average current signal Iavg on the current sharing bus 190 is an average (e.g., current or voltage) of the local output current sense signals Io of the various power converters 100 connected to the current sharing bus 190.

In one preferred embodiment (not shown in FIG. 3), the current sharing terminal Ishare may be further coupled to the PWM controller 140, thus feeding the average current signal Iavg on the current sharing bus 190 back to the PWM controller 140. The PWM controller 140 receives both the average current signal Iavg and the local output current sense signal Io, so as to adjust the duty cycle of the switching circuit 110 based on the average current signal Iavg and the local output current sense signal Io (e.g., the difference therebetween). For example, if the local output current sense signal Io is higher than the average current signal Iavg, the PWM controller 140 may decrease the duty cycle of the switching circuit 110, so as to reduce the output current of the power converter 100. On the contrary, if the local output current sense signal Io is lower than the average current signal Iavg, the PWM controller 140 may increase the duty cycle of the switching circuit 110, so as to increase the output current of the power converter 100. As such, the parallel power converters 100 may adjust the duty cycles of their switching circuits 110 to control the respective output currents, until the output currents of the power converters 100 are within a predetermined tolerance of each other, or are substantially the same. In an implementation according to a preferred embodiment of the present invention, the various power converters 100 may have output currents which differ from each other no more than about 10%, for example, thus accurately equalizing the output currents of the various power converters 100, which is beneficial for a good load regulation. It has been confirmed by simulation that, the power conversion system according to a preferred embodiment of the present invention achieves a current sharing accuracy of about 5%, or about even 2%, for example.

In a preferred embodiment of the present invention as shown in FIG. 3, the current sharing circuit 160 may further include an error amplifier 310 configured to receive the local output current sense signal Io and the average current signal Iavg, to generate a current sharing error signal Ierror. The error amplifier 310 may use the Kpi (proportion integration) feedback control, and may be powered by the power supply (a power supply of 3.3V is shown in FIG. 3 as an example, but may use other power supply voltages as desired). That is, the current sharing error signal Ierror reflects a relationship between the local output current Iout of the power converter 100 and the average output current of the plurality of power converters 100. Therefore, the PWM controller 140 may adjust the duty cycle of the switching circuit 110 according to the current sharing error signal Ierror, such that the local output current Iout of the power converter 100 falls within a predetermined tolerance of the average output current.

In a further preferred embodiment, each power converter 100 may include a combiner 320 to combine (e.g., accumulate, weight and combine, etc.,) the current sharing error signal Ierror and other error signals indicating an increase/decrease in the duty cycle (such as a difference between a reference signal and one of the input voltage sense signal Vi, the output voltage sense signal Vo, the output current sense signal Io, etc.), such that the PWM controller 140 may adjust the duty cycle of the switching circuit 110 according to the combined error signal, thus equalizing the output currents of the plurality of parallel power converters 100, and improving the Line Regulation as well as power conversion efficiency of the power converter 100.

In a preferred embodiment of the present invention, the PWM controller 140 may be implemented digitally by software programming, for example. In another preferred embodiment of the present invention, the PWM controller 140 may be implemented by a hardware circuit, for example. For example, the PWM controller 140 may include any suitable PWM signal generator 140 to generate a PWM signal, which has a duty cycle that is adjustable according to the various error signals as described above. For example, the PWM controller 140 may be implemented by a simple comparator, which may compare the current sharing error signal Ierror or a combined error signal to a triangular wave signal, thus outputting a PWM square wave signal to control the duty cycle of the switching circuit 110.

Figure 4:
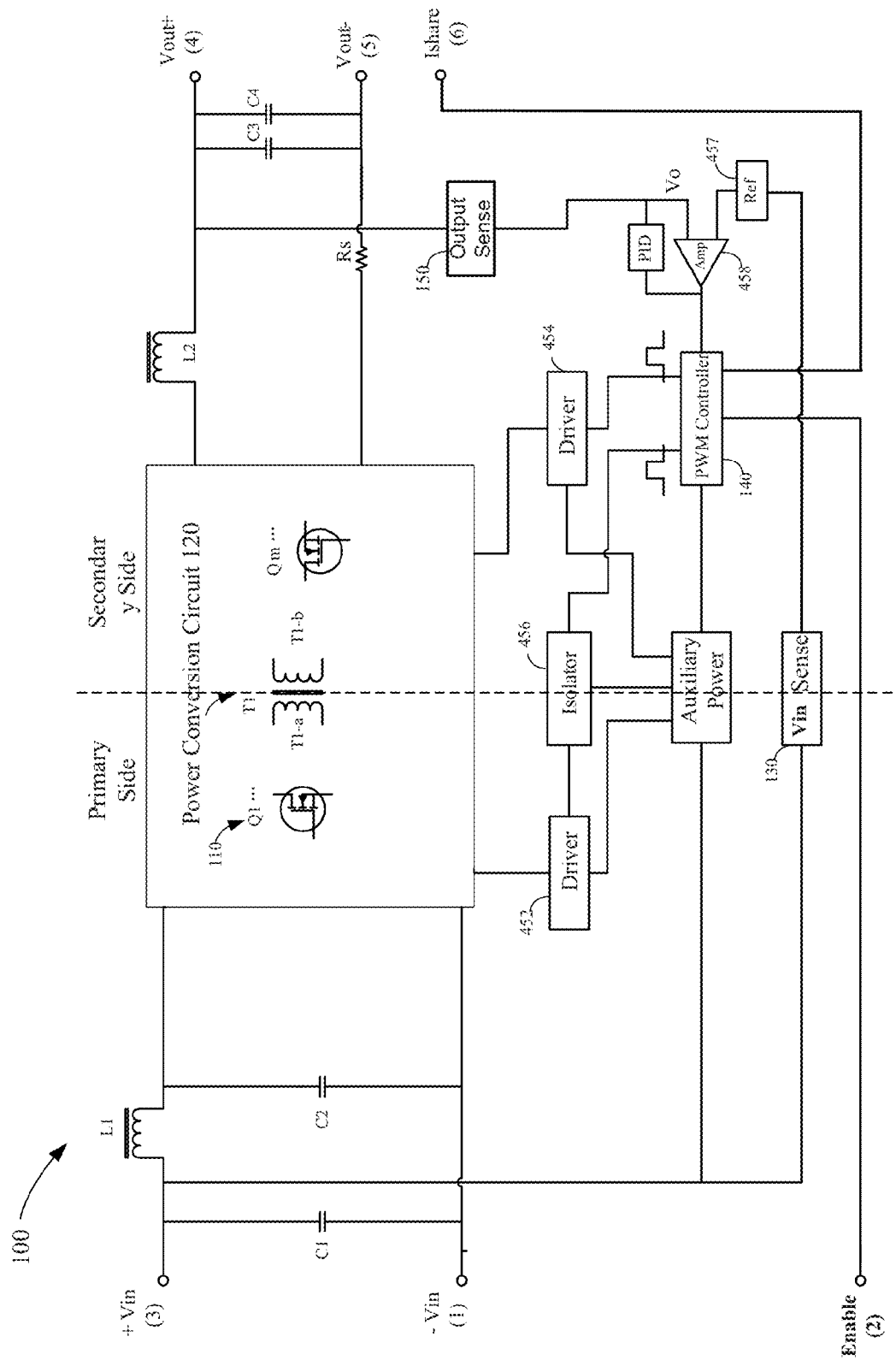
FIG. 4 illustrates a schematic diagram of an exemplary power converter according to a preferred embodiment of the present invention.

FIG. 4 illustrates a schematic diagram of an exemplary power converter 100 according to a preferred embodiment of the present invention. The power converter 100 may include six input/output ports (1)~(6), as shown in FIG. 1. As illustrated in FIG. 4, the input voltage Vin is filtered by a filtering circuit (e.g., including an inductor L1 and capacitors C1, C2) before being inputted into a switching circuit 110. The switching circuit 110 is further coupled to a primary side T1-a of a power conversion circuit 120 (e.g., shown as a transformer T1). In FIG. 4, the switching circuit 110 is denoted by a switch Q1, although it may include a switching circuit including one or more switches in implementation. A PWM controller 140, that is enabled/disabled by an enable signal on an enable terminal Enable(2) and may be powered by an auxiliary power module, may control the on/off of the switching circuit 110 based on the output of the output sense circuit 150 such that the input voltage Vin is selectively inputted into the primary winding T1-a of the transformer T1, and thus generates an output at the secondary winding T1-b of the transformer T1. This output passes through a secondary switching circuit (e.g., denoted as a switch Qm, which may include one or more switches) and an output filter (e.g., possibly including an inductor L2 and capacitors C3, C4), so as to generate an output voltage Vout and an output current Iout at the output. The secondary switching circuit Qm may be controlled by the PWM controller 140, or may be controlled by other control signals (e.g. a voltage on the secondary winding of the transformer T1, not shown). The various switches may be implemented by a variety of techniques known in the art, for example, transistor, field-effect transistor, silicon controlled thyristor, etc.

The power converter 100 may include a driver 452 configured and programmed to control the on/off of the primary switching circuit 110 according to a control signal generated by the PWM controller 140, and a driver 454 configured and programmed to control the on/off of a secondary switch Qm, etc., according to a control signal generated by the PWM controller 140. The secondary switch Qm may be controlled by other control signals (e.g. a voltage on the secondary winding of the transformer T1, not shown), without including the driver 454.

In a preferred embodiment of the present invention, the power converter 100 may be an isolated power converter, wherein the PWM controller 140 may be located on the input (primary) or output (secondary) side of the power converter 100, and the signals on one side may be transferred to the other side in an isolated manner (e.g., via a transformer, OPTO coupling, etc.). FIG. 4 schematically illustrates that the PWM controller 140 is located on the secondary side of the power converter 100. The PWM controller 140 may be located on the primary side of the power converter 100 and function similarly. To effectively isolate the primary side and the secondary side of the transformer T1, the power converter 100 may include an isolator 456, to transfer in an isolated manner the control signals generated by the PWM controller 140 at the secondary side to the primary side of the power converter 100. The isolator 456 may be implemented by any isolation circuit known in the art, for example, a transformer, an optical coupler, etc.

As described above, the output sense circuit 150 detects a local output current of the power converter 100 to provide a local output current sense signal Io. The current sharing terminal Ishare couples the local output current sense signal Io to the current sharing bus 190, and also passes an average current signal Iavg on the current sharing bus 190 to the PWM controller 140, such that the PWM controller 140 may adjust the duty cycle of the switching circuit 110 according to both the average current signal Iavg and the local output current sense signal Io.

Moreover, the output sense circuit 150 of the power converter 100 may be configured to detect an output voltage Vout to generate an output voltage sense signal Vo accordingly. The power converter 100 may further include an operational amplifier 458 configured to generate a comparison signal (which may be called an error signal) based on a difference between the output voltage sense signal Vo and a reference voltage Vref, wherein the comparison signal is provided to the PWM controller 140 as a feedback signal to control the duty cycle of the switching circuit 110, such that the output voltage Vout is maintained at a level proportional to Vref. The reference voltage Vref may be a fixed reference voltage, or an adjustable reference voltage. For example, if the output voltage sense signal Vo is higher than the reference voltage Vref, the feedback signal causes the PWM controller 140 to reduce the duty cycle, such that the output voltage Vout will decrease; if the output voltage sense signal Vo is lower than the reference voltage Vref, the feedback signal causes the PWM controller 140 to increase the duty cycle, such that the output voltage Vout will rise.

In a preferred embodiment of the present invention as illustrated in FIG. 4, the PWM controller 140 may further adjust the duty cycle of the switching circuit 110 within a preset range based at least in part on the input voltage sense signal Vi provided by the Vin sense circuit 130 such that the change rate of the output voltage Vout is lower than the change rate of the input voltage Vin, thus improving the line regulation and the power conversion efficiency.

In a preferred embodiment of the present invention, a reference voltage module 457 may generate the reference voltage Vref dynamically according to the input voltage sense signal Vi provided by the Vin sense circuit 130. For example, the reference voltage Vref may be proportional to the input voltage sense signal Vi, and thus proportional to the input voltage Vin. In the isolated system as shown in FIG. 4, the Vin sense circuit 130 may provide the reference voltage Vref to the secondary side through an isolation transport mechanism (such as a transformer, an optical coupler, etc.). In various implementations, the reference voltage Vref may be provided based on the input voltage Vin by any other approaches. As such, the reference voltage Vref varies along with the input voltage Vin. When the input voltage Vin changes, since the reference voltage Vref varies synchronously, the output voltage Vout will also vary based on the reference voltage Vref accordingly. In this case, the feedback signal provided by the operational amplifier 458 will not cause the PWM controller 140 to adjust the duty cycle, and the duty cycle remains unchanged.

For example, for a hard switching full bridge transformer using a turn ratio of 4:1, with a duty cycle of 45%,
If Vin=36V, Vref=1V, then Vout=36/4*2*45%=8.1V;
If Vin=48V, Vref=1.333V, then Vout=8.1*1.333=10.8V;
If Vin=60V, Vref=1.667V, then Vout=8.1*1.667=13.5V.

On the other hand, if the input voltage Vin does not change, but the output voltage Vout changes due to other factors, since the reference voltage Vref does not change, the feedback signal provided by the operational amplifier 458 will cause the PWM controller 140 to adjust the duty cycle such that the output voltage Vout is maintained at a level proportional to Vref. For example, a load increase may result in a drop of the output voltage Vout, then the feedback signal provided by the operational amplifier 458 may cause the PWM controller 140 to increase the duty cycle, so as to maintain the output voltage Vout unchanged. As a non-limiting example, if Vin=48V, a change from zero load to full load may potentially lead to a drop in Vout, which may be maintained at Vout=10.8V, for example, by adjusting the duty cycle (e.g., increasing the duty cycle).

In the power conversion system including a plurality of power converters according to a preferred embodiment of the present invention, each power converter 100 adjusts its local output current according to an average current signal on the current sharing bus 190, and adjusts its output voltage Vout according to a difference between its local output voltage sense signal Vo and a reference voltage Vref, such that each power converter 100 has an equalized output current and a stable output voltage. For example, when the output current changes, the output voltage may remain stable.

Figure 5:
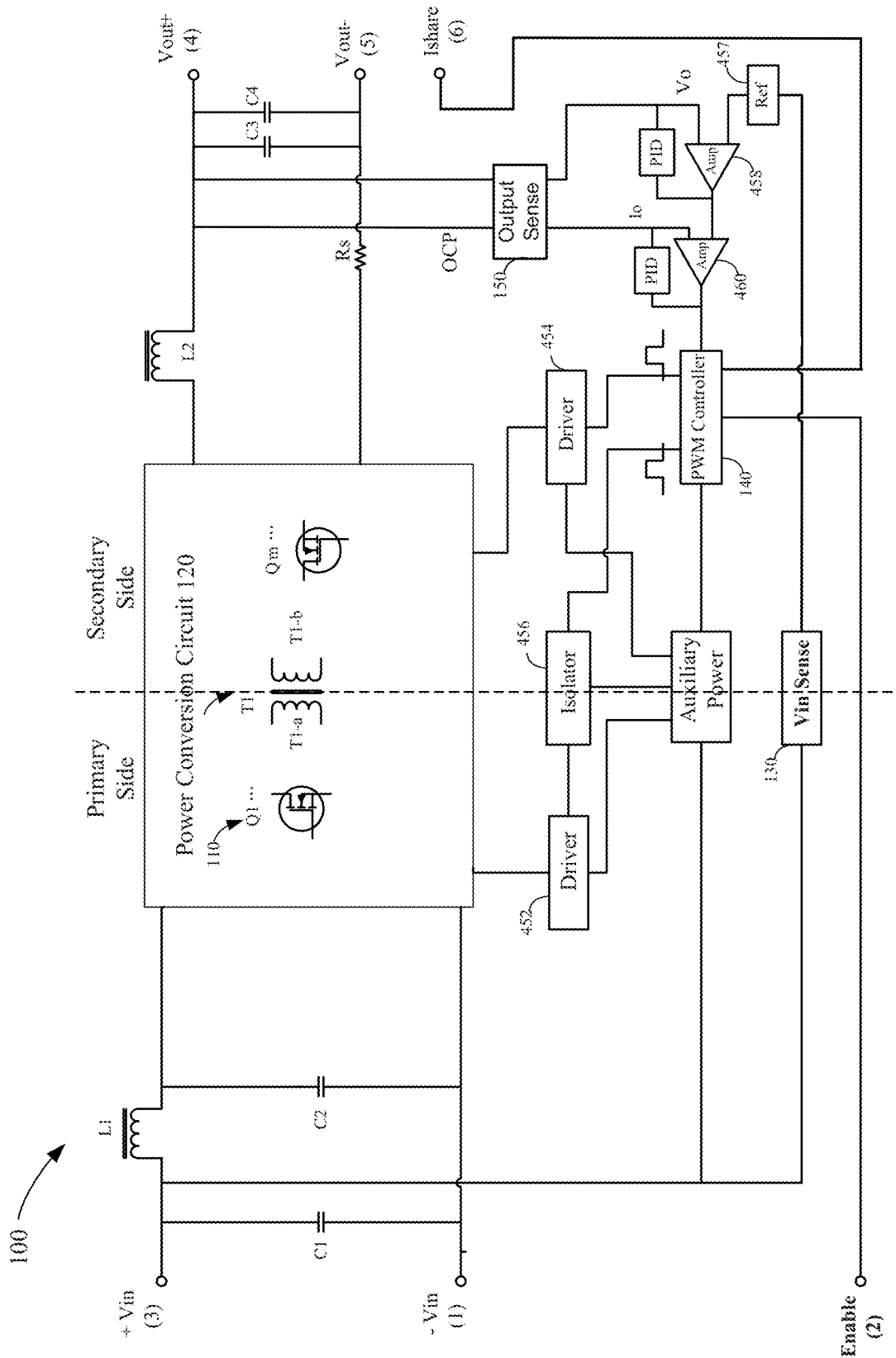
FIG. 5 illustrates a schematic diagram of another exemplary power converter according to a preferred embodiment of the present invention.

FIG. 5 illustrates a schematic diagram of another exemplary power converter 100 according to a preferred embodiment of the present invention, wherein the PWM controller 140 may adjust the duty cycle of the switching circuit 110 according to the input voltage Vin, the output voltage Vout, the output current Iout, and the average current signal on the Ishare terminal. The structures and operations of the power converter 100 as shown in FIG. 5 similar to that in FIG. 4 is not repeated here. FIG. 5 schematically illustrates that the PWM controller 140 is located on the secondary side of the power converter 100. The PWM controller 140 may be located on the primary side of the power converter 100 and function similarly. As illustrated, a first operational amplifier 458 provides a first comparison signal based on a difference between the output voltage sense signal Vo and the reference voltage Vref, and a second operational amplifier 460 generates a second comparison signal based on a difference between the output current sense signal Io and the first comparison signal, wherein the second comparison signal is provided to the PWM controller 140 as a feedback signal to control the duty cycle of the switching circuit 110. Such a power converter 100 may include an over-current protection (OCP) mechanism such that the PWM controller 140 may turn off the switching circuit 110 when the output current is too large. As described with reference to FIG. 4, the reference voltage Vref may vary along with the input voltage Vin. Therefore, if the output voltage Vout varies due to the change of the input voltage Vin, the PWM stably adjusts the duty cycle if the power converter 100 has an over-current protection (OCP) mechanism.

If the input voltage Vin does not change, but the output current Iout varies due to factors such as the load, the feedback signal provided by the operational amplifier 460 will cause the PWM controller 140 to adjust the duty cycle such that the output voltage Vout is maintained at a level proportional to Vref. For example, as the load increases, the output current Iout will decrease, then the feedback signal provided by the operational amplifier 460 causes the PWM controller 140 to increase the duty cycle, so as to maintain the output voltage Vout unchanged. Similarly, the duty cycle of the switching circuit 110 may be adjusted within a relatively narrow range, so as to achieve a high efficiency while maintaining good load regulation.

Figure 6:
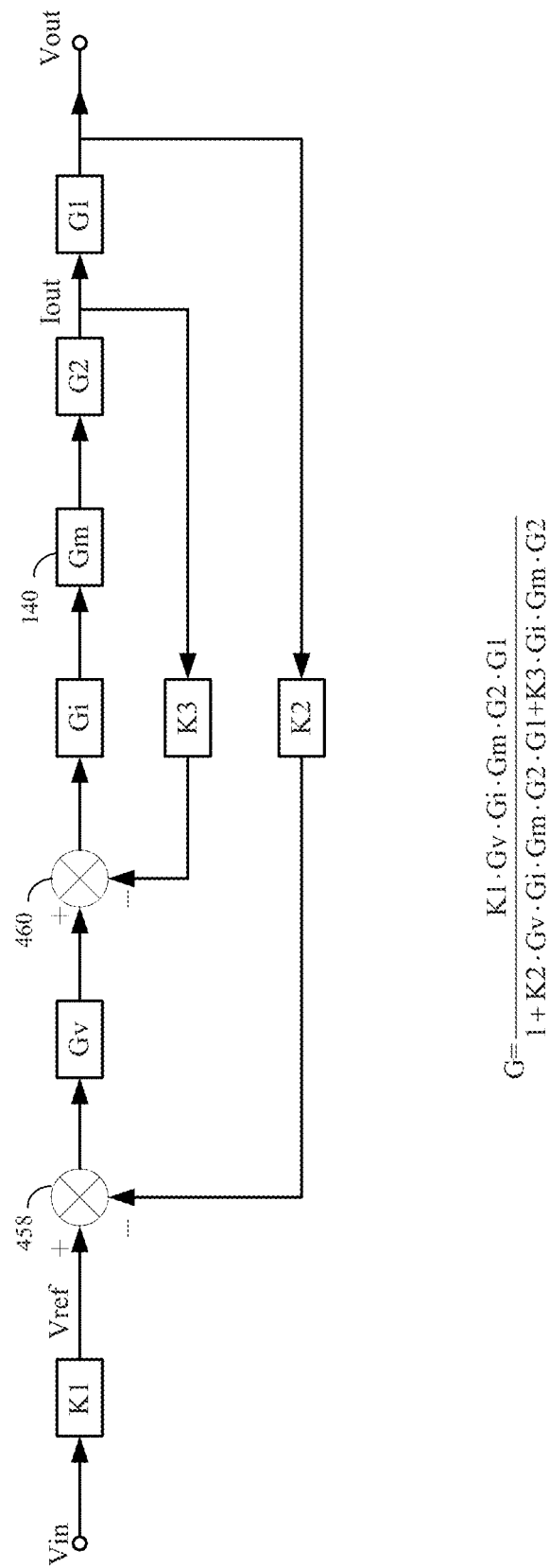
FIG. 6 illustrates a signal model diagram of the exemplary power converter as in FIG. 5 according to a preferred embodiment of the present invention.

FIG. 6 illustrates a signal model diagram of the exemplary power converter 500 as in FIG. 5 according to a preferred embodiment of the present invention. As described above, the reference voltage Vref is controlled based on the input voltage Vin, e.g., Vref=K1·Vin, wherein K1 is a scaling factor that may be configured by those skilled in the art as desired. The first operational amplifier 458 calculates and amplifies (e.g., multiplying with a coefficient Gv by proportional-integral-derivative (PID)) a difference between the detected output voltage sense signal Vo (e.g., equal to K2·Vout, wherein K2 is, for example, a scaling factor that may be configured as desired) and the reference voltage Vref, to generate the first comparison signal. The second operational amplifier 560 calculates and amplifies (e.g., multiplying with a coefficient Gi by PID) a difference between the detected output current sense signal Io (e.g., equal to K3·Iout, wherein K3 is, for example, a scaling factor that may be configured as desired) and the first comparison signal, to generate the second comparison signal as a feedback signal. The PWM controller 140 may process the feedback signal (e.g., multiplying with a scaling factor Gm) to control the duty cycle of the switching circuit 110. The parameter G2 is an equivalent transconductance value of the power train (e.g., the power conversion circuit 120), and G1 is an equivalent transconductance value of the secondary output circuit. Therefore, the transconductance of the power converter 500 may be equivalent to:

$$G = \frac{K1 \cdot Gv \cdot Gi \cdot Gm \cdot G2 \cdot G1}{1 + K2 \cdot Gv \cdot Gi \cdot Gm \cdot G2 \cdot G1 + K3 \cdot Gi \cdot Gm \cdot G2}$$

As can be seen from FIG. 6, the power converter 500 preferably includes two control loops, including an outer loop implemented by the first operational amplifier 458 and an inner loop implemented by the second operational amplifier 560. The outer loop control may maintain the duty cycle unchanged when the input voltage Vin changes, while the inner loop control may adjust the duty cycle when the output current Iout changes, so as to achieve a high efficiency and good load regulation.

Figure 7A:
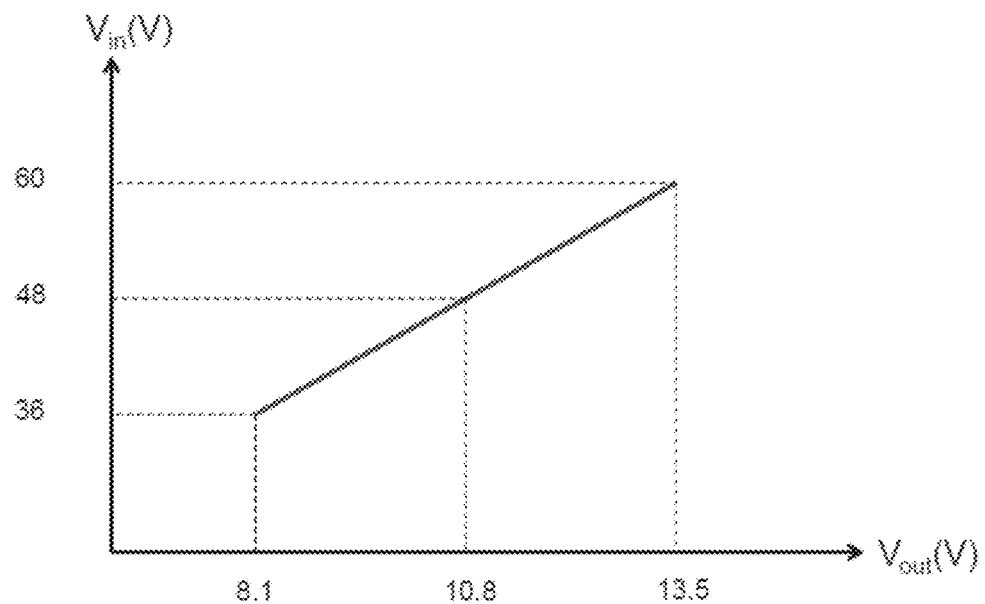
FIGS. 7A and 7B illustrate schematic waveform diagrams according to a preferred embodiment of the present invention.
Figure 7B:
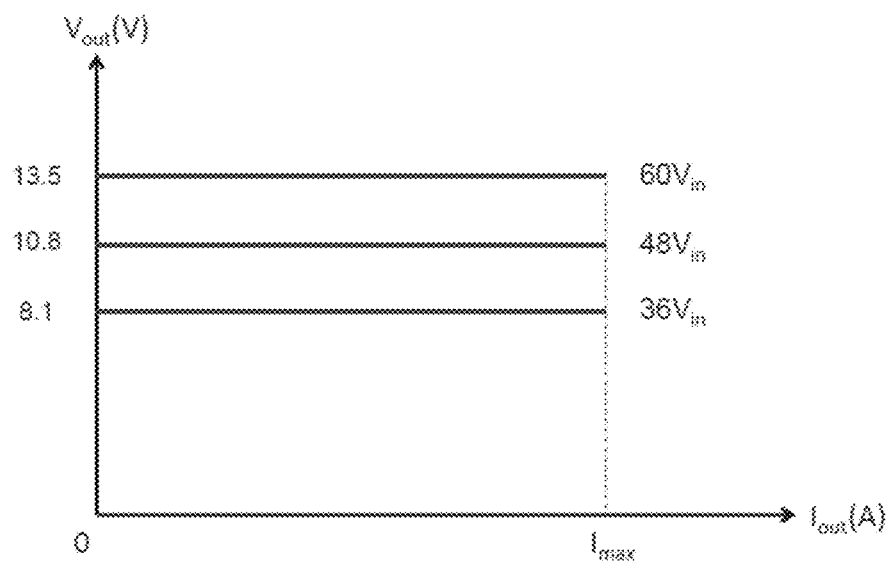

FIGS. 7A and 7B illustrate schematic waveform diagrams according to a preferred embodiment of the present invention, for example, corresponding to the power converters as shown in FIGS. 3-6. As illustrated in FIG. 7A, by adjusting the value of the reference voltage Vref based on the input voltage Vin, the output voltage Vout will varies proportionally to the change of the input voltage Vin and the duty cycle does not change, ensuring the high efficiency. As illustrated in FIG. 7B, if the input voltage Vin does not change, as the load changes (then the output current Iout will change), Vout may remain unchanged by adjusting the duty cycle within a relatively narrow range, so as to have good load regulation.

As described above, the power conversion system according to various preferred embodiments of the present invention includes a plurality of power converters to provide power to a load in parallel. Preferred embodiments of the present invention precisely equalize the output currents of the various parallel power converters, wherein each power converter adjusts the duty cycle within a relatively narrow variation range, so as to provide good load regulation. As compared with a DC/DC converter that adjusts the duty cycle within a full range, the power converters according to various preferred embodiments of the present invention achieve a higher efficiency. Meanwhile, since the duty cycle is adjusted within a relatively narrow range, the power converters according to various preferred embodiments of the present invention have a simple circuit structure, the design for the output inductor achieves a better DCR (internal resistance of the inductor), and a lower inductance and a small size is used, thus a high power density is achieved.

The operations described in connection with the aspects disclosed herein may be implemented in hardware, in software modules executed by a processor, or in combinations of both. For example, the PWM controller described herein may be implemented by a microprocessor, which may be programmed to generate a PWM control signal according to the input voltage, the output voltage (and/or the output current), to control the duty cycle of the switching circuit.

It should be understood that, the above preferred embodiments are exemplary illustrations of the present invention, and do not limit of the present invention. The various circuit structures and signal levels shown herein are exemplary, and may be modified as necessary in practice. Any applications without departing from the spirit of the present invention fall within the scope of the present invention, including isolated systems, non-isolated systems, constant current systems, constant voltage systems, intermediate bus converters, boost converters, buck converters, etc., and alternation to local construction of the circuits, the substitution of type or model of elements, other variations of the signal levels, as well as other non-substantial alterations and modifications.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A power conversion system comprising:
   at least two power converters; and
   a current sharing bus; wherein
   each of the at least two power converters includes:
   a switching circuit;
   a power conversion circuit configured to receive an input voltage via the switching circuit and to provide a local output current;
   an output sense circuit configured to detect the local output current and to generate a local output current sense signal;
   a current sharing terminal coupled to the local output current sense signal via a resistor and coupled to the current sharing bus;
   an input voltage sense circuit configured to detect the input voltage and generate an input voltage sense signal; and
   a PWM controller configured:
      to receive a current sharing error signal generated from a difference between the local output current sense signal and an average current signal on the current sharing bus and to adjust a duty cycle of the switching circuit based, at least in part, on the current sharing error signal such that the local output current sense signal is within a certain tolerance of the average current signal; and
      if the input voltage sense signal indicates a change in the input voltage, to adjust a duty cycle of the switching circuit within a preset range based on the input voltage sense signal, wherein the duty cycle of the switching circuit is increased if the input voltage sense signal indicates a decrease in the input voltage and the duty cycle of the switching circuit is decreased if the input voltage sense signal indicates an increase in the input voltage, such that the output voltage varies along with the input voltage and such that a change rate of the output voltage is lower than a change rate of the input voltage.

2. The power conversion system of claim 1, wherein each of the at least two power converters includes an error amplifier configured to receive the local output current sense signal and the average current signal to generate the current sharing error signal.

3. The power conversion system of claim 1, wherein in each of the at least two power converters:
   if the local output current sense signal is higher than the average current signal, the duty cycle of the switching circuit is decreased; or
   if the local output current sense signal is lower than the average current signal, the duty cycle of the switching circuit is increased.

4. The power conversion system of claim 1, wherein
   the output sense circuit is configured to detect a local output voltage of the power conversion circuit and generate a local output voltage sense signal;

the PWM controller is configured to adjust the duty cycle of the switching circuit further based on the local output voltage sense signal.

5. The power conversion system of claim 1, wherein each of the at least two power converters includes:
a reference voltage module configured to generate a reference voltage based on the input voltage sense signal provided by the input voltage sense circuit such that the reference voltage is proportional to the input voltage; and
a first operational amplifier configured to generate a first comparison signal based on a difference between a local output voltage sense signal and the reference voltage, the local output voltage sense signal being generated by the output sense circuit detecting a local output voltage of the power conversion circuit, the first comparison signal being provided to the PWM controller as a feedback signal; wherein
the PWM controller is configured to adjust the duty cycle of the switching circuit within a preset range according to the feedback signal such that the output voltage is maintained at a level proportional to the reference voltage.

6. The power conversion system of claim 5, each of the at least two power converters includes a second operational amplifier configured to generate a second comparison signal based on a difference between the local output current sense signal and the first comparison signal, the second comparison signal being provided to the PWM controller as the feedback signal.

7. The power conversion system of claim 1, wherein if the input voltage does not change, the PWM controller adjusts the duty cycle of the switching circuit within a preset range such that the output voltage remains unchanged.

8. The power conversion system of claim 1, wherein the power converter is an isolated power converter, and includes an isolator to transfer signals in an isolated manner between a primary side and a secondary side of the power converter.

9. A method for controlling a power conversion system including at least two power converters and a current sharing bus, the method comprising the steps of, in each power converter:
receiving an input voltage via a switching circuit and providing a local output current;
detecting the local output current and generating a local output current sense signal;
coupling the local output current sense signal to the current sharing bus via a resistor;
generating a current sharing error signal from a difference between the local output current sense signal and an average current signal on the current sharing bus;
receiving the current sharing error signal at a PWM controller;
detecting the input voltage and generating an input voltage sense signal;
adjusting a duty cycle of the switching circuit by the PWM controller based on the current sharing error signal such that the local output current sense signal is within a certain tolerance of the average current signal; and
if the input voltage sense signal indicates a change in the input voltage, adjusting a duty cycle of the switching circuit within a preset range based on the input voltage sense signal, wherein the duty cycle of the switching circuit is increased if the input voltage sense signal indicates a decrease in the input voltage and the duty cycle of the switching circuit is decreased if the input voltage sense signal indicates an increase in the input voltage, such that the output voltage varies along with the input voltage and such that a change rate of the output voltage is lower than a change rate of the input voltage.

10. The method of claim 9, further comprising the steps of, in each power converter:
decreasing the duty cycle of the switching circuit if the local output current sense signal is higher than the average current signal; or
increasing the duty cycle of the switching circuit if the local output current sense signal is lower than the average current signal.

11. The method of claim 9, further comprising the steps of, in each power converter:
detecting a local output voltage and generating a local output voltage sense signal; and
adjusting the duty cycle of the switching circuit further based on the local output voltage sense signal.

12. The method of claim 9, further comprising the steps of, in each power converter:
generating a reference voltage based on the input voltage sense signal such that the reference voltage is proportional to the input voltage;
generating a first comparison signal as a feedback signal based on a difference between a local output voltage sense signal and the reference voltage, the local output voltage sense signal being generated by detecting a local output voltage; and
adjusting the duty cycle of the switching circuit within a preset range according to the feedback signal such that the output voltage is maintained at a level proportional to the reference voltage.

13. The method of claim 12, further comprising the step of, in each power converter, generating a second comparison signal as the feedback signal based on a difference between the local output current sense signal and the first comparison signal.

14. The method of claim 9, wherein:
if the input voltage does not change, the duty cycle of the switching circuit is adjusted within a preset range such that the output voltage remains unchanged.

15. The method of claim 9, wherein the power converter is an isolated power converter, and includes an isolator to transfer signals in an isolated manner between a primary side and a secondary side of the power converter.

16. A power conversion system comprising:
at least two power converters; and
a current sharing bus; wherein
each of the at least two power converters include:
means for receiving an input voltage via a switching circuit and providing a local output current;
means for detecting the local output current and generating a local output current sense signal;
means for coupling the local output current sense signal to the current sharing bus via a resistor;
means for generating a current sharing error signal from a difference between the local output current sense signal and an average current signal on the current sharing bus;
means for receiving the current sharing error signal at a PWM controller;
means for detecting the input voltage and generating an input voltage sense signal;
means for adjusting a duty cycle of the switching circuit by the PWM controller based on the current sharing error signal such that the local output current sense signal is within a certain tolerance of the average current signal; and means for, if the input voltage sense signal indicates a change in the input voltage, adjusting a duty cycle of the switching circuit within a preset range based on the input voltage sense signal, wherein the duty cycle of the switching circuit is increased if the input voltage sense signal indicates a decrease in the input voltage and the duty cycle of the switching circuit is decreased if the input voltage sense signal indicates an increase in the input voltage, such that the output voltage varies along with the input voltage and such that a change rate of the output voltage is lower than a change rate of the input voltage.

17. The power conversion system of claim 16, wherein each of the at least two power converters includes:

means for decreasing the duty cycle of the switching circuit if the local output current sense signal is higher than the average current signal; and means for increasing the duty cycle of the switching circuit if the local output current sense signal is lower than the average current signal.

18. The power conversion system of claim 16, wherein each of the at least two power converters includes:

means for detecting a local output voltage and generating a local output voltage sense signal; and means for adjusting the duty cycle of the switching circuit further based on the local output voltage sense signal.

19. The power conversion system of claim 16, wherein each of the at least two power converters includes:

means for generating a reference voltage based on the input voltage sense signal such that the reference voltage is proportional to the input voltage;

means for generating a first comparison signal as a feedback signal based on a difference between a local output voltage sense signal and the reference voltage, the local output voltage sense signal being generated by detecting a local output voltage; and means for adjusting the duty cycle of the switching circuit within a preset range according to the feedback signal such that the output voltage is maintained at a level proportional to the reference voltage.

20. The power conversion system of claim 19, wherein each of the at least two power converters includes:

means for generating a second comparison signal as the feedback signal based on a difference between the local output current sense signal and the first comparison signal.

21. The power conversion system of claim 16, wherein each of the at least two power converters includes:

means for adjusting the duty cycle of the switching circuit within a preset range if the input voltage does not change, such that the output voltage remains unchanged.

22. The power conversion system of claim 16, wherein the power converter is an isolated power converter, and includes an isolator to transfer signals in an isolated manner between a primary side and a secondary side of the power converter.

* * * * *